US009407563B2

(12) United States Patent
Kanamarlapudi et al.

(10) Patent No.: US 9,407,563 B2
(45) Date of Patent: Aug. 2, 2016

(54) METHODS AND APPARATUSES FOR ADAPTING APPLICATION UPLINK RATE TO WIRELESS COMMUNICATIONS NETWORK

(71) Applicant: QUALCOMM Incorporated, San Diego, CA (US)

(72) Inventors: Sitaramanjaneyulu Kanamarlapudi, San Diego, CA (US); Venkata Ramanan Venkatachalam Jayaraman, Del Mar, CA (US); Rohit Kapoor, San Diego, CA (US); Rashid Ahmed Akbar Attar, San Diego, CA (US); Christopher Gerard Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/178,074

(22) Filed: Feb. 11, 2014

(65) Prior Publication Data
US 2015/0043337 A1    Feb. 12, 2015

Related U.S. Application Data

(60) Provisional application No. 61/864,975, filed on Aug. 12, 2013.

(51) Int. Cl.
*H04J 1/16* (2006.01)
*H04L 12/825* (2013.01)
(Continued)

(52) U.S. Cl.
CPC ............... *H04L 47/25* (2013.01); *H04L 47/30* (2013.01); *H04W 28/02* (2013.01); *H04W 72/1252* (2013.01); *H04W 72/1268* (2013.01); *H04W 80/02* (2013.01)

(58) Field of Classification Search
CPC ....... H04L 47/25; H04L 47/30; H04W 28/02; H04W 72/1252; H04W 72/1268; H04W 80/02
See application file for complete search history.

(56) References Cited

U.S. PATENT DOCUMENTS 8,521,209 B2    8/2013  Kim et al.
2007/0071030 A1  3/2007  Lee
(Continued)

FOREIGN PATENT DOCUMENTS

| EP | 1708524 A1 | 10/2006 |
|---|---|---|
| GB | 2454606 A | 5/2009 |
| WO | WO-2012139016 A2 | 10/2012 |

OTHER PUBLICATIONS

International Search Report and Written Opinion—PCT/US2014/050322—ISA/EPO—Oct. 29, 2014.

*Primary Examiner* — Chi H Pham
*Assistant Examiner* — Raul Rivas
(74) *Attorney, Agent, or Firm* — Loza & Loza LLP

(57) ABSTRACT

Various apparatuses and methods for transmitting uplink data of an application at a user equipment are provided. In one aspect of the disclosure, uplink data of an application at a user equipment (UE) is transmitted to a network. A first amount of the uplink data expected to be buffered at a radio link control (RLC) layer is determined based on a latency of the application. A second amount of the uplink data available for transmission at the RLC layer is determined based on information provided by a modem of the UE. A data rate of the application is dynamically adjusted based on a difference between the first amount and second amount of the uplink data. In another aspect of the disclosure, an amount of the application data buffered at the RLC layer is maintained to be greater than a predetermined threshold that sets a Happy bit at an unhappy setting. The unhappy setting is communicated to the network, a data rate of the application is increased in response to an increased grant from the network due to the unhappy setting. In another aspect of the disclosure, a maximum modem supported data rate at which the user equipment (UE) transmits uplink data of an application is determined based on an uplink channel capacity estimate, a modem queue length estimate, a codec rate change frequency of the application, and a delay threshold of the modem queue.

14 Claims, 15 Drawing Sheets

(51) Int. Cl.
    *H04W 72/12*   (2009.01)
    *H04W 28/02*   (2009.01)
    *H04L 12/835*  (2013.01)
    *H04W 80/02*   (2009.01)

(56) References Cited

U.S. PATENT DOCUMENTS

| | | |
|---|---|---|
| 2007/0097257 A1 | 5/2007 | El-Maleh et al. |
| 2007/0291744 A1 | 12/2007 | Lundberg et al. |
| 2010/0098047 A1 | 4/2010 | Zhou et al. |
| 2011/0038264 A1* | 2/2011 | Ishii ............... H04L 47/10 370/238 |
| 2011/0075742 A1 | 3/2011 | Zhang et al. |
| 2012/0102140 A1 | 4/2012 | Nadas et al. |
| 2013/0163430 A1 | 6/2013 | Gell et al. |
| 2014/0148188 A1* | 5/2014 | Widell ............ H04W 72/085 455/452.2 |

* cited by examiner

METHODS AND APPARATUSES FOR ADAPTING APPLICATION UPLINK RATE TO WIRELESS COMMUNICATIONS NETWORK

CROSS-REFERENCE TO RELATED APPLICATIONS

This application claims priority to and the benefit of provisional patent application No. 61/864,975 filed in the United States Patent Office on 12 Aug. 2013, the entire content of which is incorporated herein by reference.

TECHNICAL FIELD

Aspects of the present disclosure relate generally to wireless communication systems, and more particularly, to methods and apparatuses for adapting application uplink rate to the condition of a wireless communication network.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In a UMTS network, radio resources are allocated to a given user equipment (UE) based on UE characteristics as well as the network resource management that is based on the current radio environment. Some examples of the UE characteristics include UE category, supported functionalities, current radio conditions as indicated by the channel quality indicator (CQI), power control bits, etc. Network resource management is based on the radio environment, congestion, power control and the quality-of-service (QOS) of the application, user privileges, etc.

As the modem characteristics and radio resource management algorithm are typically not known from the application user's perspective, an application might experience frequent stalls and loss of data during a particular session. Even when QOS is negotiated for the application, with the variations in the actual bandwidth, data might still get stalled at the radio link control (RLC) level. As most applications available for a UE are written based on the LAN based underlying infrastructure, resource management variations in the wireless environment can have foreseeable impact on the user experience such as smoothness of media data delivery.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide a method of wireless communication operable at a user equipment (UE). The UE transmits uplink data of an application operating at the UE to a network. The UE determines a first amount of the uplink data expected to be buffered at a radio link control (RLC) layer based on a latency of the application, and determines a second amount of the uplink data available for transmission at the RLC layer based on information provided by a modem of the UE. The UE dynamically adjusts a data rate of the application based on a difference between the first amount of the uplink data and the second amount of the uplink data.

Another aspect of the disclosure provides a method of wireless communication operable at a user equipment (UE). The UE transmits application data of the UE to a network. The UE maintains an amount of the application data buffered at a radio link control (RLC) layer to be greater than a predetermined threshold that sets a Happy bit at an unhappy setting, and communicates the unhappy setting to the network. The UE increases a data rate of the application in response to an increased grant from the network due to the unhappy setting.

Another aspect of the disclosure provides a method of determining a data rate of an application at a user equipment (UE). The UE determines an uplink channel capacity estimate of an uplink channel and determines a modem queue length estimate of a modem queue. The UE determines a maximum modem supported data rate at which the UE transmits uplink data of an application based on the uplink channel capacity estimate, the modem queue length estimate, a codec rate change frequency of the application, and a delay threshold of the modem queue.

Another aspect of the disclosure provides an apparatus for wireless communication. The apparatus includes at least one processor, a communication interface coupled to the at least one processor, and a memory coupled to the at least one processor. The at least one processor includes a number of circuitries including first through fourth circuitries. The first circuitry is configured to transmit uplink data of an application operating at the apparatus to a network. The second circuitry is configured to determine a first amount of the uplink data expected to be buffered at a radio link control (RLC) layer based on a latency of the application. The third circuitry is configured to determine a second amount of the uplink data available for transmission at the RLC layer based on information provided by a modem of the apparatus. The fourth circuitry is configured to dynamically adjust a data rate of the application based on a difference between the first amount of the uplink data and the second amount of the uplink data.

Another aspect of the disclosure provides an apparatus for wireless communication. The apparatus includes at least one processor, a communication interface coupled to the at least one processor, and a memory coupled to the at least one processor. The at least one processor includes a number of circuitries including first through fourth circuitries. The first circuitry is configured to transmit application data of the apparatus to a network. The second circuitry is configured to maintain an amount of the application data buffered at a radio link control (RLC) layer to be greater than a predetermined threshold that sets a Happy bit at an unhappy setting. The third circuitry is configured to communicate the unhappy setting to the network. The fourth circuitry is configured to increase a data rate of the application in response to an increased grant from the network due to the unhappy setting.

Another aspect of the disclosure provides an apparatus for wireless communication. The apparatus includes at least one processor, a communication interface coupled to the at least one processor, and a memory coupled to the at least one processor. The at least one processor includes a number of circuitries including first through third circuitries. The first circuitry is configured to determine an uplink channel capacity estimate of an uplink channel. The second circuitry is configured to determine a modem queue length estimate of a modem queue. The third circuitry is configured to determine a maximum modem supported data rate at which the apparatus transmits uplink data of an application based on the uplink channel capacity estimate, the modem queue length estimate, a codec rate change frequency of the application, and a delay threshold of the modem queue.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure are directed to improving the smoothness of application data transmissions between a user equipment (UE) and a network/UE by utilizing a number of modem characteristics and radio resource management algorithms. Accordingly, the application data rate may be dynamically adjusted to prevent or reduce the occurrence of undesirable conditions such as application data stalling and underutilization of available uplink bandwidth.

Figure 1:
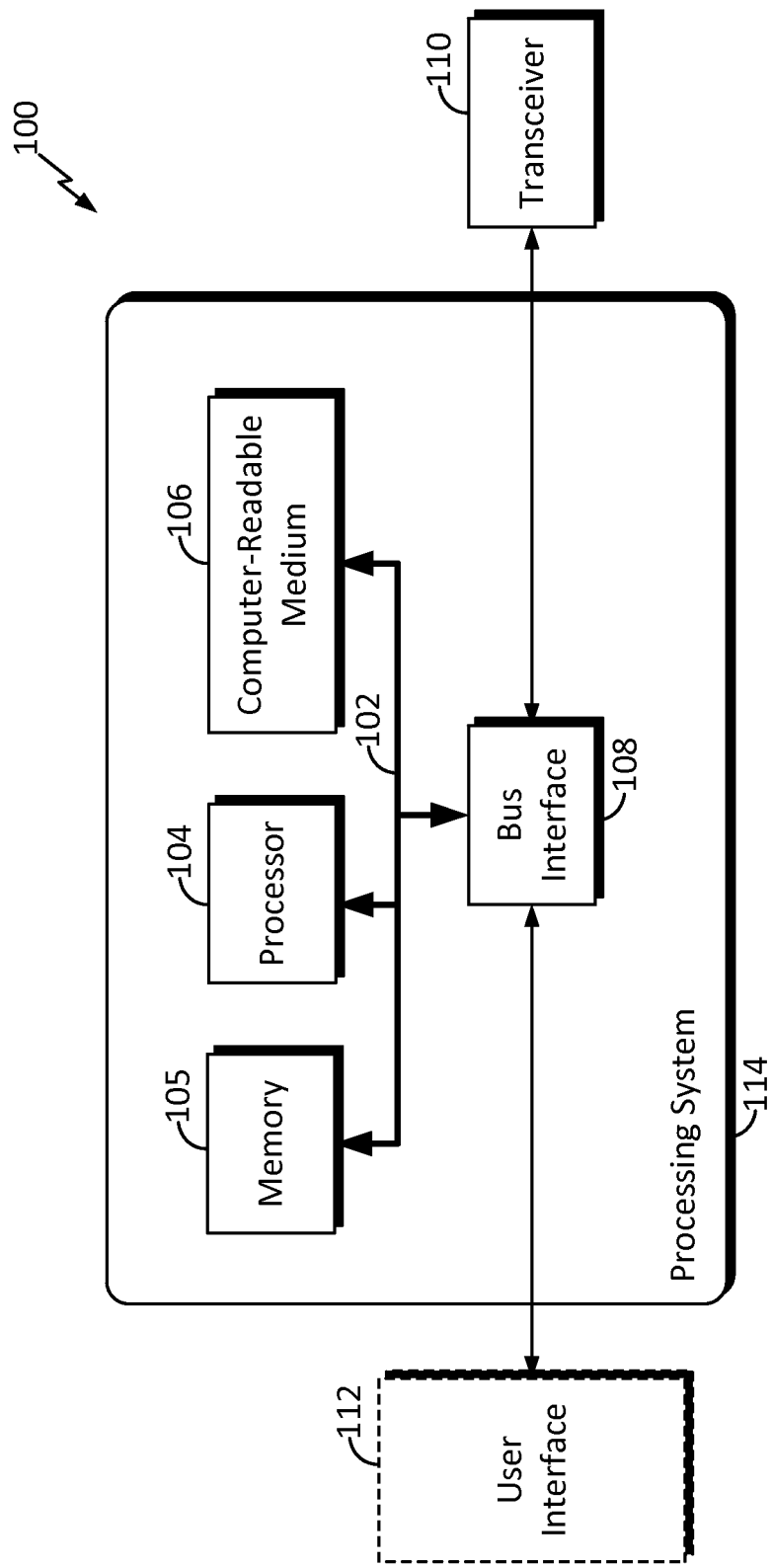
FIG. 1 is a block diagram illustrating an example of a hardware implementation for an apparatus employing a processing system.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2, 3, 5, and/or 12. In another example, the apparatus 100 may be a radio network controller (RNC) as illustrated in any one or more of FIGS. 2 and/or 3. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes or methods described below and illustrated in FIGS. 6-10 and 12-14.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. In an aspect of the disclosure, the transceiver 110 may include a modem. In another aspect of the disclosure, the processing system may include a modem (not shown). Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
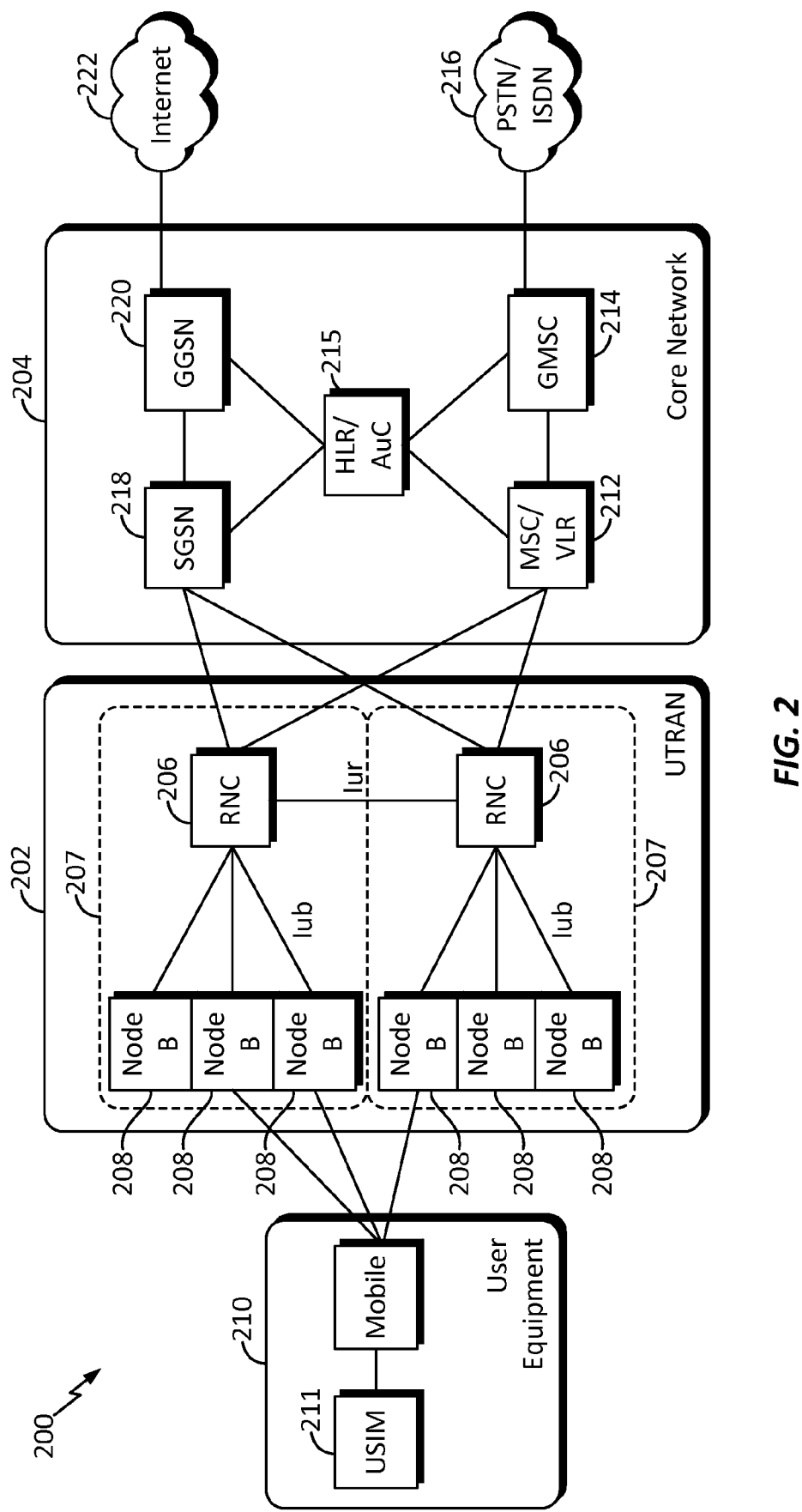
FIG. 2 is a conceptual block diagram illustrating an example of a telecommunications system.

The various concepts presented throughout this disclosure may be implemented across a broad variety of telecommunication systems, network architectures, and communication standards. Referring now to FIG. 2, as an illustrative example without limitation, various aspects of the present disclosure are illustrated with reference to a Universal Mobile Telecommunications System (UMTS) system 200. A UMTS network includes three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208.

The core network 204 can interface with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a serving GPRS support node (SGSN) 218 and a gateway GPRS support node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain. The packet-switched data services may support various applications (e.g., video telephony) running at the UE 210 in data communication with other entities in the Internet 222, for example.

Figure 3:
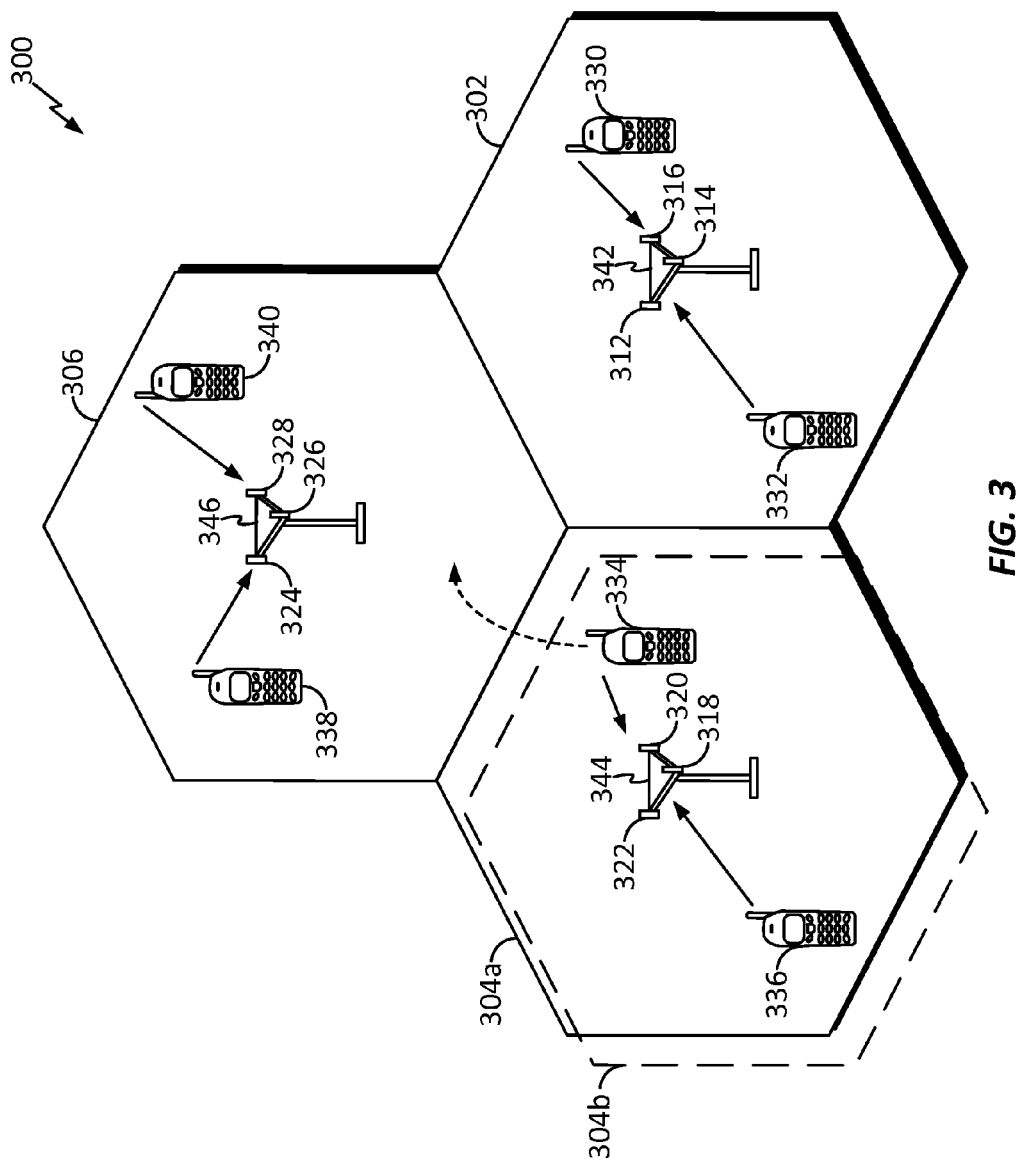
FIG. 3 is a conceptual diagram illustrating an example of an access network.

The UTRAN 202 is one example of a RAN that may be utilized in accordance with the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call or data communication with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set, that is, a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

A high speed packet access (HSPA) air interface includes a series of enhancements to the 3G/W-CDMA air interface between the UE 210 and the UTRAN 202, facilitating greater throughput and reduced latency for users. Among other modifications over prior standards, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink or EUL).

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
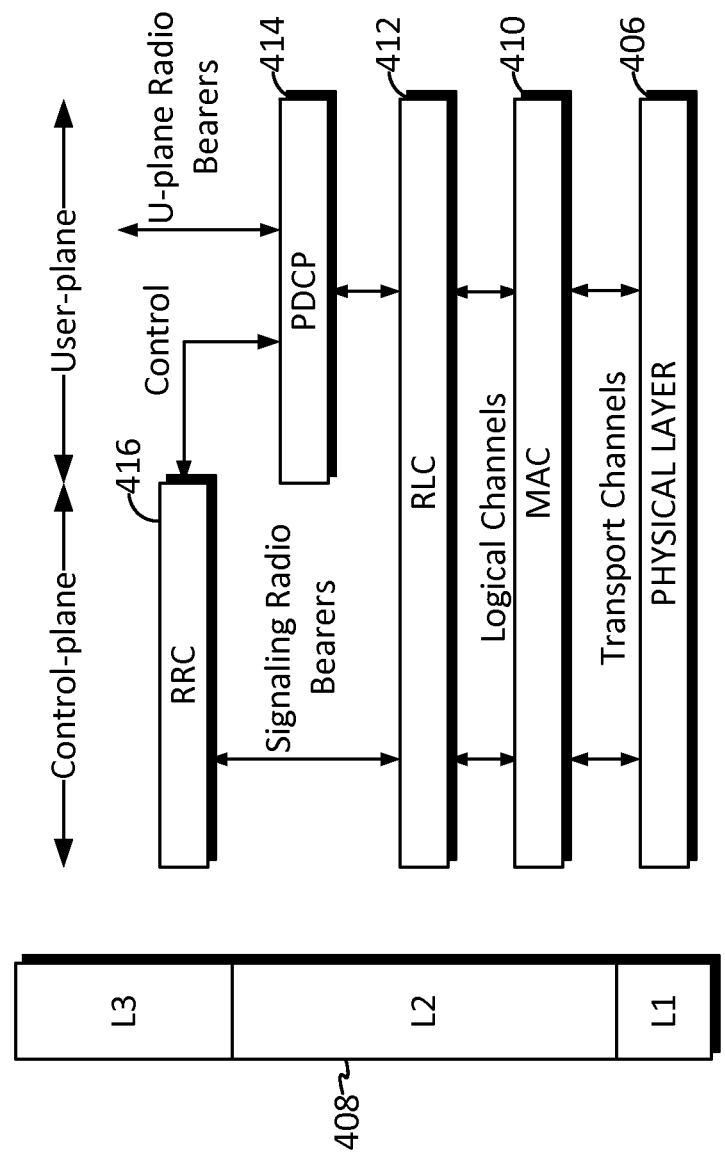
FIG. 4 is a conceptual diagram illustrating an example of a radio protocol architecture for the user and control plane.

Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. The RRC layer 416 includes a number of functional entities for routing higher layer messages (e.g., application data), handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, video telephony server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities. The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

Aspects of the disclosure will be described below with the above-described UMTS system 200, as an example, in which the application is adapted to the radio resource management needs or variations in a wireless communications network such that the smoothness of the application data flow over the wireless interface may be improved. Some aspects of the disclosure provide techniques that can invoke the smooth or gradual variation in the application management based on the radio resource management of the wireless network.

In a W-CDMA system, radio resource management (RRM) algorithms are responsible for efficient utilization of the air interface resources. Functions of the RRM include, for example, assuring Quality of Service (QoS), maintaining the planned coverage area, and offering high capacity connections. The RRM algorithms can be divided into handover control, power control, admission control, load control, and packet scheduling functionalities. The RRM algorithms can be based on the amount of hardware (e.g., UEs) operating in the network and/or on the interference levels in the air interface.

In W-CDMA, the access stratum has complete knowledge about the current radio conditions and the available bandwidth for a given UE 210. HSUPA operates on a request-grant principle where the UEs request permission to send data and a packet scheduler decides when and how many UEs will be allowed to do so. A request for transmission contains data about the state of the transmission buffer and the queue at the UE and its available power margin. In HSUPA logic, the Node B 208 controls the grant given per UE up to a granularity of one transmit time interval (TTI) (e.g., 10 ms or 2 ms TTI).

Figure 5:
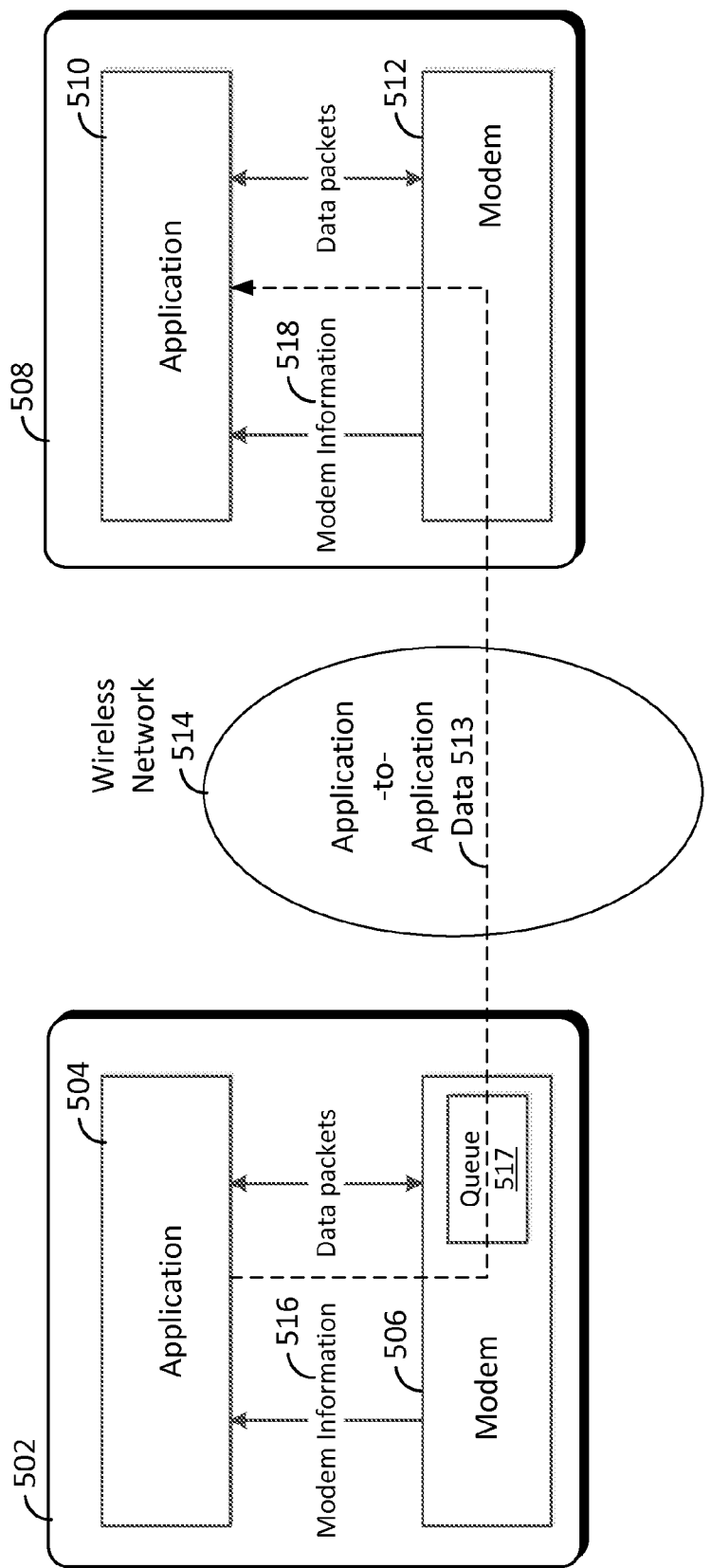
FIG. 5 is a conceptual block diagram illustrating two user equipments in data communication via a network in accordance with some aspects of the present disclosure.

FIG. 5 is a block diagram conceptually illustrating two UEs in data communication via a network in accordance with some aspects of the present disclosure. In an aspect of the disclosure, the UEs in FIG. 5 may be any of the UEs shown in FIG. 3. A first UE 502 includes an application 504 and a modem 506. The first UE 502 may be in data communication with a second UE 508. The second UE 508 includes a peer application 510 and a modem 512. The applications 504 and 510 may be Internet Protocol applications (e.g., video telephony application), and each of the applications may be stored in a suitable storage medium (e.g., a computer-readable medium 106) of the respective UE. In some aspects of the disclosure, the first UE 502 and second UE 508 may perform audio and/or video telephone communication.

When the UEs 502 and 508 are in data communication, application-to-application data 513 may be transferred between the UEs via their respective modems 506 and 512 over a wireless network 514 (e.g., RAN 300). Furthermore, the application 504 receives modem information 516 from the modem 506 such that the application 504 can determine expected and actual amount of uplink application data queued in a queue (or buffer) 517 of the modem 506. Similarly, the application 510 may receive modem information 518 from its modem 512. The expected amount of uplink data buffered at the queue 517 should be no greater than the latency of the application.

In an aspect of the disclosure, the modem information 516 may be utilized by the UE 502 to determine a network metric that may include uplink available bandwidth, downlink available bandwidth, packet loss, uplink queue length, and/or other useful channel information. In an aspect of the disclosure, the UE 502 may transmit application-to-application data 513 by a wireless uplink channel to the UE 508 via other network entities, such as, but not limited to, one or more base stations or Node Bs (e.g., Node B 208) and one or more RNCs (e.g., RNC 206).

Figure 6:
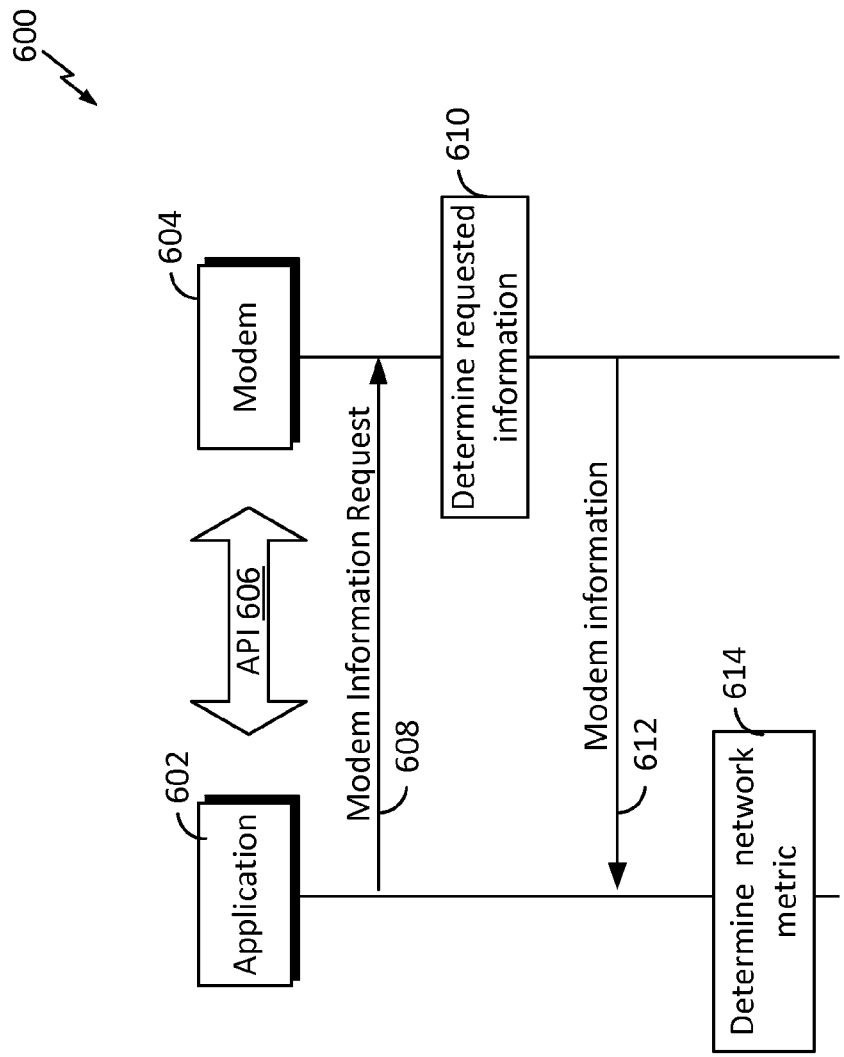
FIG. 6 is a conceptual diagram illustrating a message flow between an application and a modem of a user equipment in accordance with an aspect of the disclosure.

FIG. 6 is a conceptual diagram illustrating a message flow 600 between an application 602 and a modem 604 at a UE in accordance with an aspect of the disclosure. The application 602 and the modem 604 may communicate with each other over a modem application programming interface (API) 606. The application 602 may be the application 504, and the modem 604 may be the modem 506 (FIG. 5). The application 602 may transmit a modem information request message 608 to the modem 604 over the API 606. An example of the modem API 606 is disclosed in a copending U.S. patent application Ser. No. 14/019,843, and the entire content of this copending application is incorporated herein by reference. In response to the modem information request message 608, the modem 604 determines the requested information (block 610). For example, the requested information may be the uplink data rate and/or uplink RLC queue status. Then, the modem 604 sends the requested modem information 612 to the application 602 over the API 606. The requested modem information 612 may be the modem information 516. Based on the modem information 612, the UE can determine a network metric (block 614) that may include uplink available bandwidth/data rate, downlink available bandwidth/data rate, packet loss, uplink queue length, and/or other useful data channel information.

Figure 7:
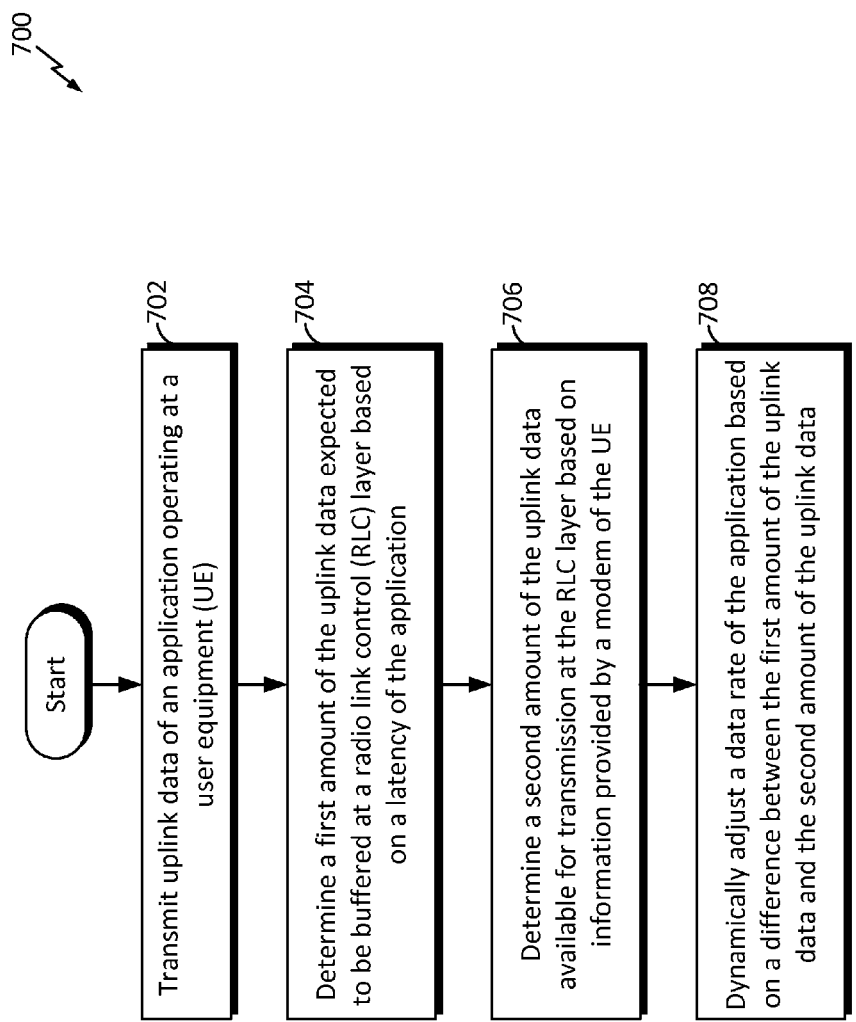
FIG. 7 is a flow chart illustrating a method of dynamically adjusting an application data rate at a user equipment in accordance with some aspects of the disclosure.

FIG. 7 is a flow chart illustrating a method 700 of dynamically adjusting a data rate of an application at a user equipment in accordance with some aspects of the disclosure. The method 700 may be implemented by the application 504 of the UE 502. In an aspect of the disclosure, the application can adapt to changing radio resource condition to improve the flow of application data over the wireless network. The UE 502 may transmit uplink data of the application 504 (e.g., audio/video telephone application) operating at the UE to a network (block 702). For example, the UE 502 may transmit application-to-application data 513 to a peer UE 508 via the wireless network 514. The UE determines a first amount of the uplink data expected to be buffered at an RLC layer based on a latency of the application (block 704). The latency of the application may include propagation delay, node delay and/or network congestion delay, and may be affected by the radio environment. For example, a voice communication application may have a latency of about 200 milliseconds (ms). In this case, the UE may determine that the first amount of the uplink data expected to be buffered at the RLC layer is a suitable amount of TTI frames worth of data up to and no greater than 200 ms.

In addition, the UE may determine a second amount of the uplink data available for transmission at the RLC layer based on the modem information 516 provided by the modem 506 of the UE (block 706). For example, the uplink data may be buffered at the queue 517 of the modem. Furthermore, the UE dynamically adjusts a data rate of the application based on a difference between the first amount of the uplink data and the second amount of the uplink data. By adjusting the data dynamically, the UE may improve the smoothness (e.g., avoid stalling, freezing, etc.) of the application data flow. The method 700 will be described in more detail below.

Figure 8:
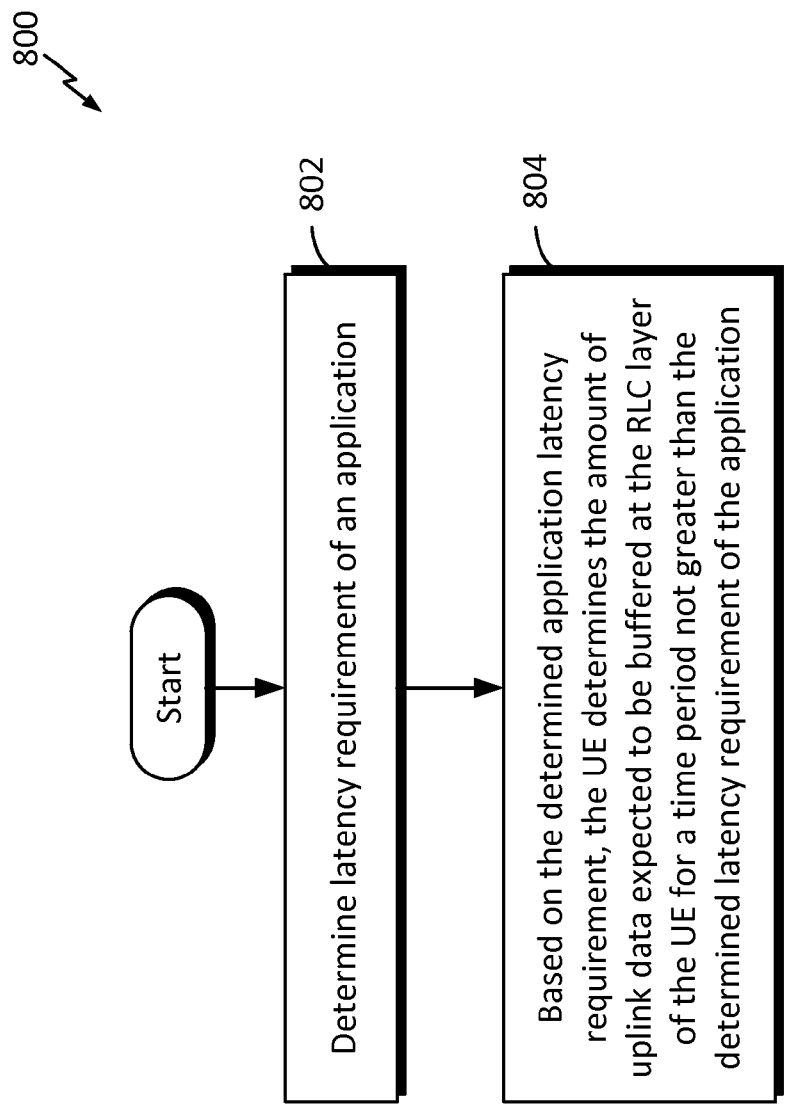
FIG. 8 is a flow chart illustrating a method of determining an amount of uplink data expected to be buffered at a radio link control (RLC) layer based on a latency requirement of an application at a UE in accordance with an aspect of the disclosure.

FIG. 8 is a flow chart illustrating a method 800 of determining an amount of uplink data expected to be buffered at an RLC layer based on a latency requirement of an application at a UE in accordance with an aspect of the disclosure. By way of example and not limitation, the method 800 may be performed by the UE 502 at the block 704. First, the UE 502 determines the latency requirement of an application (block 802). For example, for voice application, the latency requirement may be about 200 ms for an acceptable user experience. The application may be the application 504 that transmits uplink data to a wireless network (e.g., RAN 300). Based on the determined application latency requirement, the UE determines the amount of uplink data expected to be buffered at the RLC layer of the UE for a time period not greater than the determined latency requirement of the application (block 804). In some aspects of the disclosure, the amount of uplink data expected to be buffered may be a configurable parameter (e.g., Y TTI frames worth of data) at the UE. The value of this parameter may be selected to be greater than a Happy bit delay condition to ensure sufficient resources will be allocated to the UE by the network. In UMTS, the Happy bit is transmitted on the enhanced uplink dedicated physical control channel (E-DCH). Also, the value of this configurable parameter is selected such that no UL data will be queued or buffered at the UE longer than the latency requirement of the corresponding application. In some aspects of the disclosure, by buffering data more than the Happy bit "Happy" condition and less than the latency requirement, the UE will request for more resources from the network to improve the application data rate in the uplink. In response, the network may increase its grant to the UE such that the application data rate can be increased. More detail on the Happy bit will be described in relation to FIG. 13 below.

Figure 9:
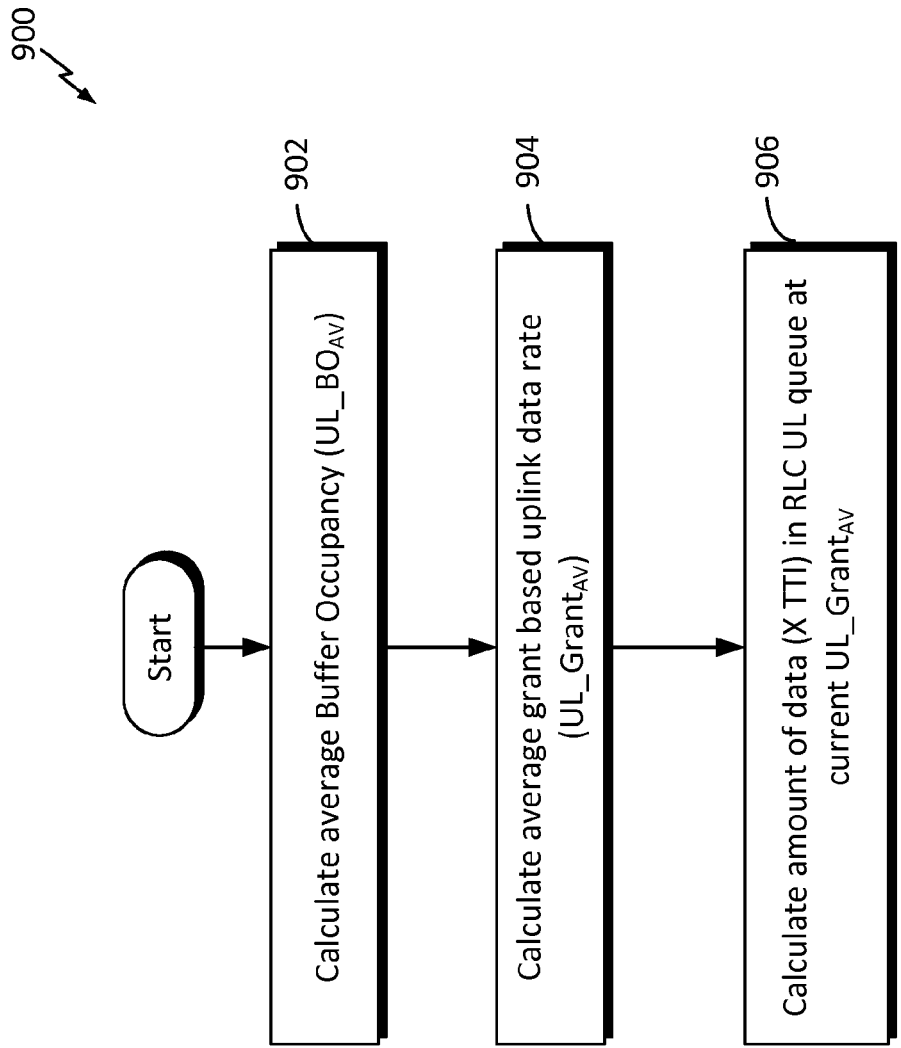
FIG. 9 is a flow chart illustrating a method of determining an amount of uplink data available for transmission at an RLC layer based on information provided by a modem of a user equipment in accordance with an aspect of the disclosure.

FIG. 9 is a flow chart illustrating a method 900 of determining an amount of uplink data available for transmission at an RLC layer based on information provided by a modem of a UE in accordance with an aspect of the disclosure. By way of example and not limitation, the method 900 may be performed by the UE 502 at the block 706. The UE 502 may be transmitting uplink data to a network (e.g., RAN 300), and the uplink data may be the application data 513 (e.g., media streaming data, audio/video data, etc.). The uplink data may be buffered or enqueued at the RLC layer of the UE. For example, the uplink data may be stored in the RLC layer uplink queue 517. The amount of uplink data available for transmission at the uplink queue 517 may be referred to as a Buffer Occupancy. At the UE, RLC services provided at the RLC layer can calculate the average Buffer Occupancy ($UL\_BO_{av}$) (average amount of uplink data in the queue) based on the instantaneous amount of data available for transmission at the queue 517 over a certain period T of time (block 902).

At the UE, the MAC layer EUL logic knows the serving network grant at every TTI level. That is, the MAC layer knows when data can be sent in the uplink (UL) direction per TTI. Therefore, the MAC layer can calculate an average grant based UL data rate ($UL\_Grant_{av}$) (average amount of uplink data rate) based on the instantaneous uplink data rate over the same period T of time (block 904). However, the UE may transmit uplink data at a rate lower that the average grant based UL data rate ($UL\_Grant_{av}$) due to other factors such as transmitter headroom limitations and/or radio environment, etc.

For a certain $UL\_Grant_{av}$, the number (X) of TTI frames worth of data present in the RLC layer UL queue available for transmission may be determined by the Equation (1) below (block 906). The calculated X TTI frames of data may be the second amount of uplink data in block 706.

$$XTTI = \frac{UL\_BO_{av}}{UL\_Grant_{av}} \qquad \text{Equation (1)}$$

Figure 10:
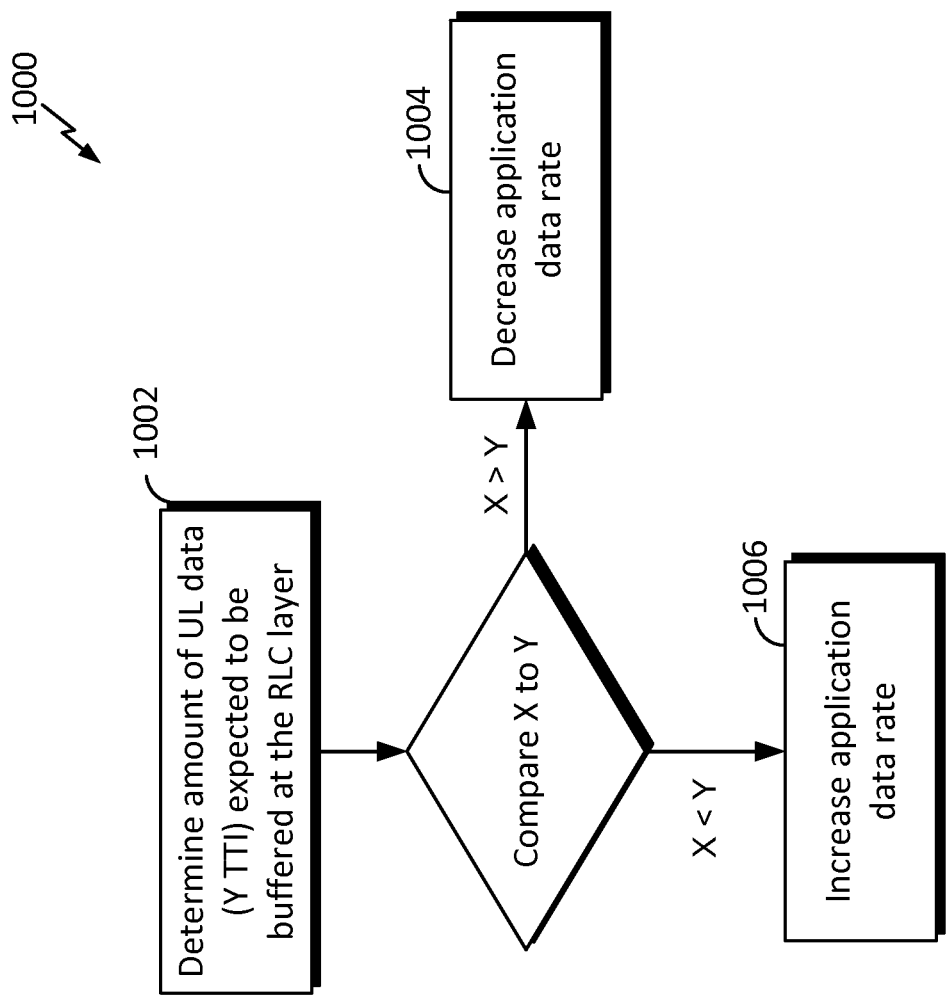
FIG. 10 is a flow chart illustrating a method of dynamically adjusting an application data rate based on an amount of application data available for transmission at an RLC layer in accordance with an aspect of the disclosure.

FIG. 10 is a flow chart illustrating a method 1000 of dynamically adjusting an application data rate based on an amount of application data available for transmission and an expected amount of buffered application data at an RLC layer in accordance with an aspect of the disclosure. The method 1000 may be performed by the UE 502 at the block 708 to dynamically adjust a data rate of the application 504 based on a difference between an amount of uplink data (e.g., Y TTI frames) expected to be buffered at the RLC layer and an amount of uplink data (e.g., X TTI frames) available for transmission at the RLC layer. Considering the latency requirement of the application layer, it can be determined that Y TTI frames of data are expected to be buffered at the RLC layer (block 1002). For example, the method 800 (FIG. 8) may be used to determine that Y TTI frames of uplink data are expected to be buffered based on the application layer latency, and the method 900 (FIG. 9) may be used to determine that X TTI frames of data are available for transmission at the RLC layer.

Referring to FIG. 10, if it is determined that X is greater than Y, the method 1000 continues to block 1004; otherwise, if it is determined that X is less than Y, the method 1000 continues to block 1006. In block 1004, if X is greater than Y, the application can decrease (slow down) its data rate because the data queued in the RLC UL queue is greater than the expected amount of buffered uplink data. In block 1006, if X is less than Y, the application can increase its data rate because the data queued in the RLC UL queue is less than the expected amount of buffered uplink data. If X is equal to Y, the application may keep the data rate unchanged.

In accordance with the method illustrated in FIGS. 7-10, the application layer data rate at the UE can be dynamically adjusted based on a difference between the amount data present in the RLC UL queue and the expected amount of buffered data based on the latency requirement of the application layer. In an aspect of the disclosure, the application data rate may be adjusted according to the Equation (2) below.

New Application UL Rate=Current UL Rate×fn(Z)   Equation (2)

In the function fn(Z), Z indicates the excessive data present in the RLC UL buffer or queue. For example, the excessive data may be determined as X−Y frames of data, where X and Y may be determined in accordance with the methods shown in FIGS. 8 and 9. The excessive data will change due to variations in the network grant with respect to the application layer data rate or due to difference in the grant with respect to application layer data rate. The function fn(z) may be any suitable functions that can smoothly or gradually adjust the UL application data rate to a desired value. In an aspect of the present disclosure, the fn(Z) may be an exponential function 1100 conceptually illustrated in the graph of FIG. 11. The x-axis (horizontal) of the graph indicates the outstanding number of TTI frames worth of data (e.g., excessive data X−Y), and the y-axis (vertical) represents the value of the function fn(Z). The function fn(Z) has a value of 1 for a Z value of 0 (e.g., X−Y=0), which indicates the grant based UL data rate is substantially or exactly matching the uplink traffic of the application. In this case, the new application data rate remains the same as the current UL data rate in accordance with Equation (2).

Figure 11:
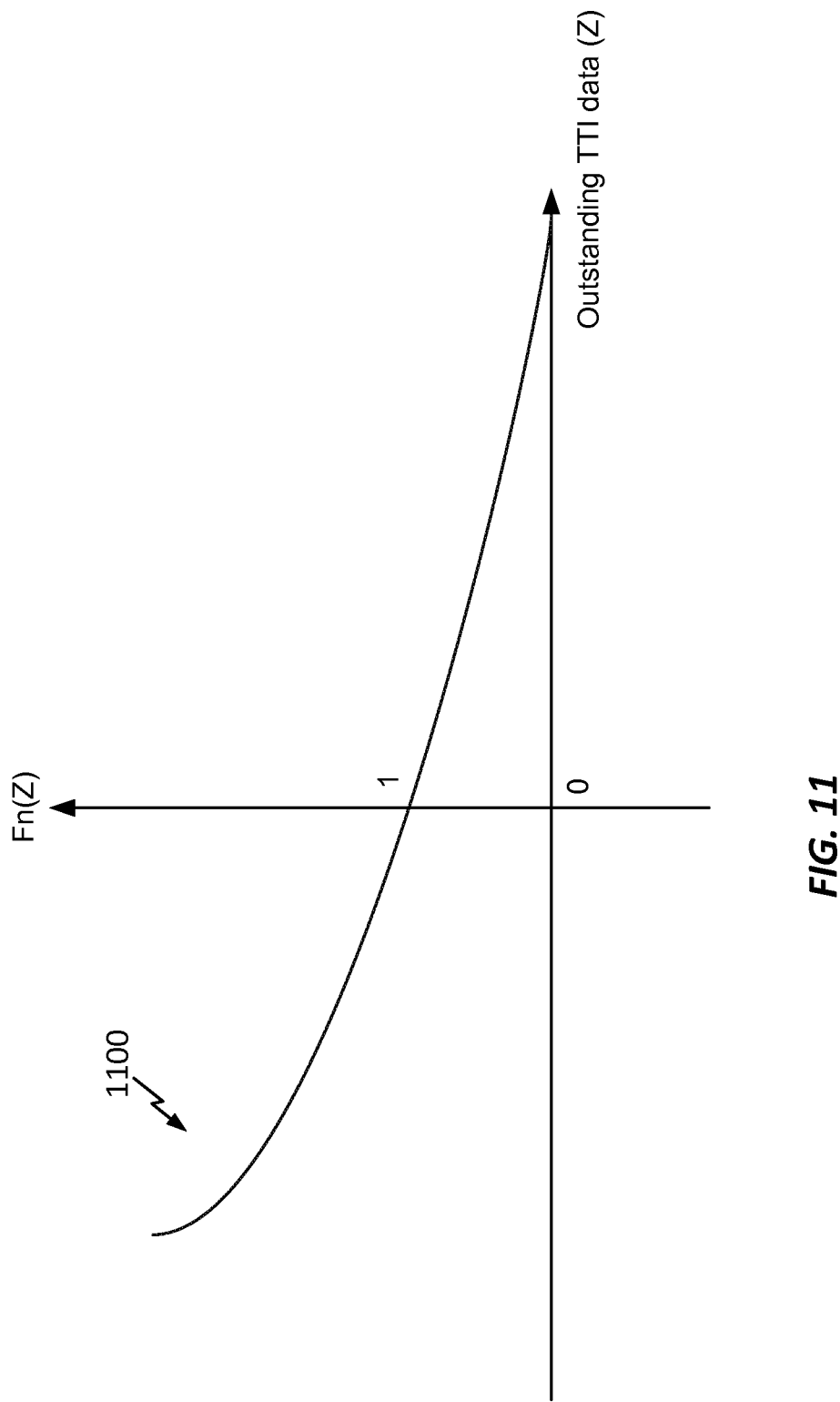
FIG. 11 is a graph illustrating a function for adjusting an uplink application data rate at a user equipment in accordance with an aspect of the disclosure.

When the value of Z increases in the positive direction, the value of the function fn(Z) gradually decreases and is less than 1. As a result, the new application data rate is reduced in accordance with Equation (2). On the contrary, when the value of Z becomes increasingly negative, the value of the function fn(Z) gradually increases. As such, the new application data rate is increased in accordance with Equation (2). It should be appreciated that the function shown in FIG. 11 is just one exemplary function that may be used in this disclosure. In other aspects of the disclosure, the function fn(Z) may be any suitable functions that can smoothly or gradually adjust the application data rate in accordance with Equation (2).

With the above described technique illustrated with FIGS. 7-12, the UE can dynamically adjust the application data rate smoothly or gradually as a result of changing UL grant or other network conditions based on the information provided by the UE modem. Therefore, the application will be able to proactively adjust, for example, the needed coding rate like encoding or flow control techniques without abrupt stalling, and the user experience may be improved.

Figure 12:
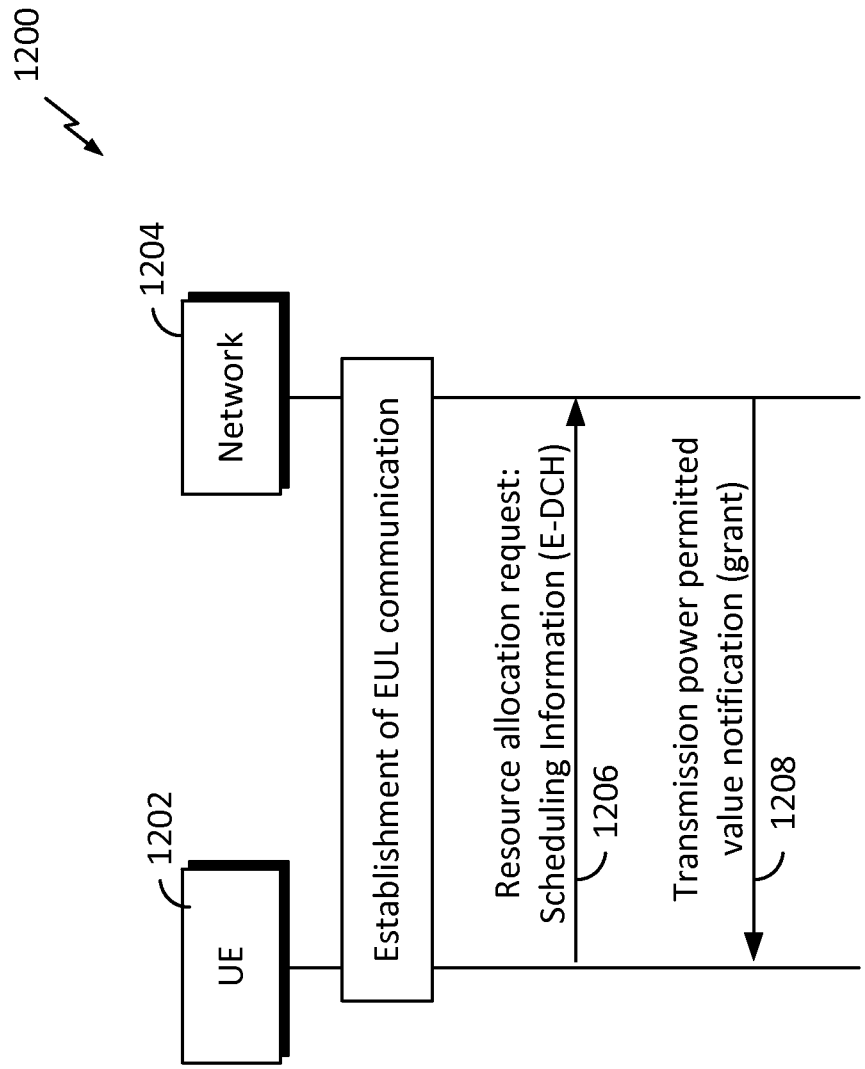
FIG. 12 is a conceptual diagram illustrating a message flow of uplink transmission power allocation between a user equipment and a network.

With EUL, the uplink transmission power is allocated in accordance with the resource allocation requests from the UE as well as the uplink radio condition measured at the base station. Referring to FIG. 12, upon the start of EUL communication, a UE 1202 transmits a resource allocation request signal 1206 called scheduling information to a network 1204. The UE 1202 may be the UE 502. When the network 1204 (base station or Node B) receives the request signal, it notifies the UE the absolute grant (network grant) 1208 specifying the maximum transmission power the UE is permitted to use for transmitting UL data.

With the scheduling information 1206, the UE 1202 can indicate its outstanding buffer occupancy status, highest priority logical channel, and whether or not the UE is "happy" (via the Happy bit) with the serving grant, etc. to the network 1204. In UMTS, the Happy bit is transmitted on the E-DCH. The UE can use the Happy bit to indicate whether or not the UE can use a higher uplink data rate. If the UE cannot use a higher uplink data rate (e.g., headroom limited), the Happy bit is set to the "happy" position and, thus, there is no need for the scheduler to increase the uplink data rate or grant. However, without the "unhappy" indication from the UE, even if the UE has a sufficiently large buffer occupancy, the network will not increase the grant to the UE because the radio resources appear to be optimally managed from the network's perspective. While the above-described UL grant based logic in FIGS. 7-12 can ensure that the application data rate is dynamically adjusted to match the UL grant from the network, it can be further improved to request additional grant from the network such that the application data rate can be further increased to give the best possible data rate to the end user.

Figure 13:
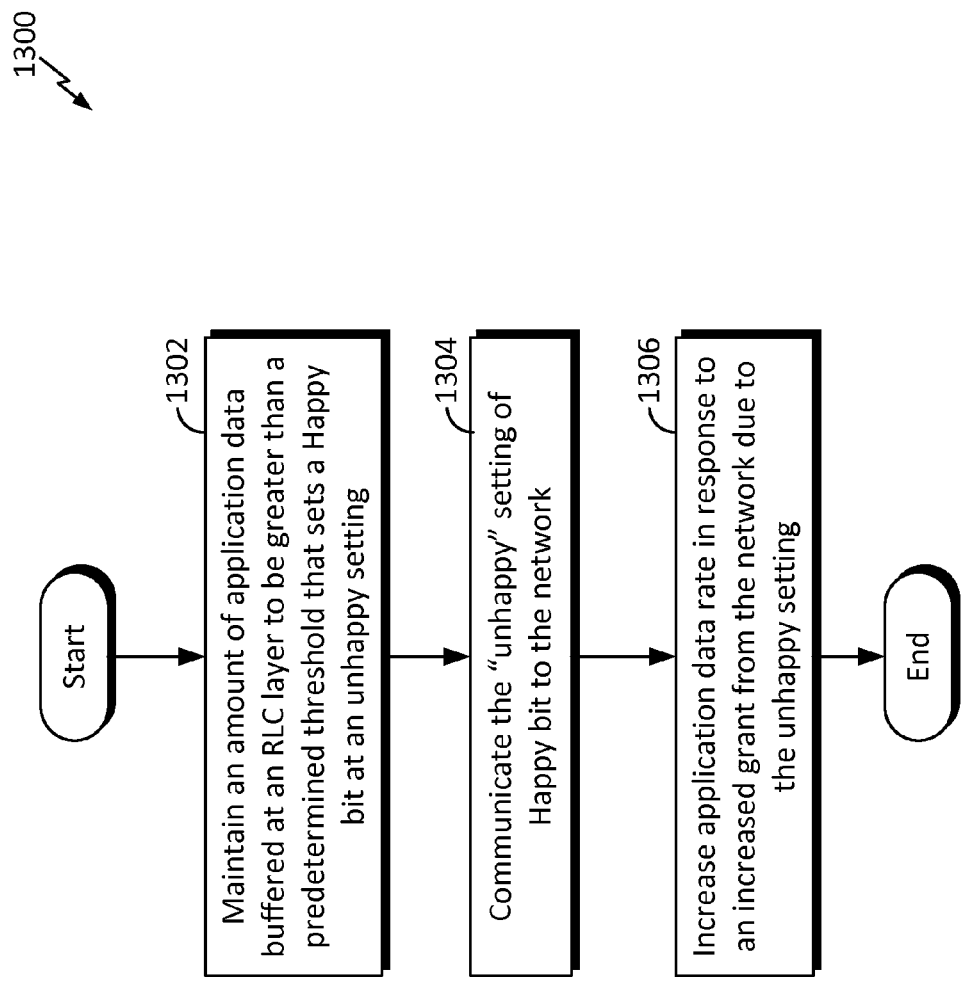
FIG. 13 is a flow chart illustrating a method for increasing a network grant based on a Happy bit setting in accordance with an aspect of the disclosure.

FIG. 13 is a flow chart illustrating a method 1300 for increasing a network grant based on a Happy bit setting in accordance with an aspect of the disclosure. The method 1300 may be performed by the UE 502 in block 704 to request more UL grant from the network (e.g., a RAN 300). In consideration of the application latency requirement, the UE may select the value of Y (amount of TTI frames worth of data expected to be buffered) to be sufficiently greater than the Happy bit condition to ensure that the UE can negotiate more resources from the network to have a higher data rate (e.g., highest data rate) available to the application. Using the above defined fn(Z) equation for example, the application layer will try to maintain an amount of application data (e.g., Y TTI frames worth of data) buffered at the RLC layer to be greater than a predetermined threshold that will set a Happy bit in the "unhappy" setting (block 1302). The unhappy setting of the Happy bit may be communicated to the network on an E-DCH for example (block 1304).

In response to the unhappy setting, the network may increase or maximize the resource management to keep the UE happy, for example, by increasing the UE's serving grant. In response to the increased grant, the application layer may be requested to increase its data rate (block 1306). Accordingly, the application data rate may be adjusted to a higher data rate (e.g., a peak data rate) as early as possible with the network resource management control at the radio level. When the UE is getting into the happy mode due to the increased grant, the value of fn(Z) will fall below zero according to the function 1100 (see FIG. 11) because the UE can transmit data at the higher data rate.

In an aspect of the disclosure, the application 504 (FIG. 5) may be a video telephony (VT) application. The VT application operates under tight delay (latency) constraints due to its interactive nature. In order to maintain a desirably low delay or latency, the VT application needs to be aware of the maximum rate at which it may transmit data through the modem without incurring significant queuing delay. For example, if there is no queue build up at the modem, the VT application may transmit at the estimated uplink channel capacity without incurring queuing delay at the modem. On the other hand, if there is already queue built up at the modem, the VT application may transmit at a lower rate in order to allow the queue to drain. Therefore, it is desirable to consider both the estimated uplink channel capacity and the estimate of the queue length at the modem, so as to arrive at a maximum rate that the modem can support without significant queue/delay build up.

Figure 14:
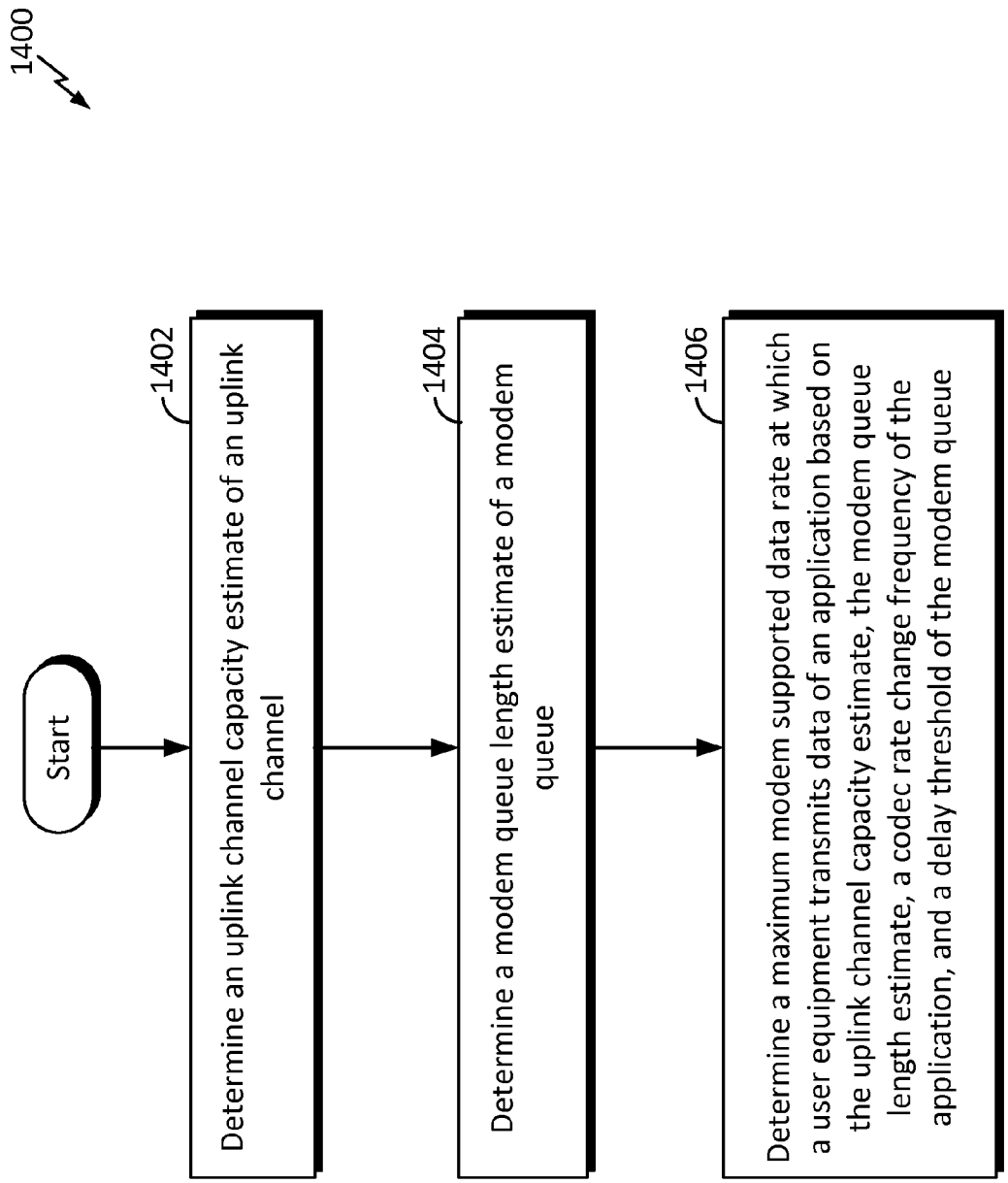
FIG. 14 is a flow chart illustrating a method for determining a maximum modem supported data rate of an application at a user equipment in accordance with an aspect of the disclosure.

FIG. 14 is a flow chart illustrating a method 1400 of determining a maximum modem supported data rate of an application at a UE in accordance with an aspect of the disclosure. The application may be the application 504 (e.g., a VT application) that is transmitting uplink data to a network utilizing an uplink channel (e.g., E-DCH). In one aspect of the disclosure, the method 1400 may be performed in the block 708 (FIG. 7). In the method 1400, the UE determines an uplink channel capacity estimate of an uplink channel (block 1402) and a modem queue length estimate of a modem queue (block 1404). The modem queue length estimate may be determined by the method 900 (see FIG. 9). Then, the UE may determine a maximum modem supported data rate at which it may transmit data of the application based on the uplink channel capacity estimate, the modem queue length estimate, a codec rate change frequency of the application, and a delay threshold of the modem queue (block 1406). Accordingly, the UE can transmit data at the maximum modem supported data rate without incurring a significant queuing delay at the modem queue. In one aspect of the disclosure, the queuing delay will be less than the expected latency of the application. In one aspect of the disclosure, the UE may utilize this maximum modem supported data rate as an upper limit in the method 700 to adjust the application data rate.

In an aspect of the disclosure, an algorithm for estimating the capacity of an uplink channel (e.g., E-DCH) is described below. The data capacities of a number of individual TTIs can be summed over a period of time T that corresponds to a transmit window length. An uplink channel capacity estimate is computed at a given time t by applying the algorithm over the time period T immediately preceding t. In an example, T is equal to the length of a predetermined window length parameter L, which may correspond to a transmission window length for the UE. In other words, in an aspect of the disclosure, T=(t−L, t). Therefore, the uplink channel capacity estimate at time t may be determined by the Equation (3) below over a time period T:

$$UL \text{ Channel Capacity Estimate } (t) = \frac{\sum_{Relevant\ TTIs\ in\ T} TTI \text{ Data Capacity}}{\text{Total Time Occupied by Relevant } TTIs} \quad \text{Equation (3)}$$

Therefore, as represented by the above equation (3), an uplink channel capacity estimate at time t can be determined by summing the TTI data capacities at all relevant TTIs over T and dividing that sum by the total amount of time occupied by the relevant TTIs. In an aspect of the disclosure, a TTI is considered relevant where there exists data awaiting transmission during the TTI or data is transmitted or retransmitted during the TTI.

In an aspect of the disclosure, the maximum modem supported rate for handling the VT data can be determined in accordance with Equation (4).

$$\text{Maximum Modem Supported Rate} = \quad \text{Equation (4)}$$
$$\max\left(\text{Modem\_uplink\_channel\_capacity} - \frac{\max(\text{Modem\_queue\_length} - \text{Q\_offset}, 0)}{\text{Q\_drain\_duration}}, 0\right)$$

The parameter Modem_queue_length may be the estimated modem queue length in block 1404. The parameters Q_offset and Q_drain_duration can vary dynamically. In one aspect of the disclosure, the value of Q_drain_duration may be set to depend on the frequency with which the video codec is able to change its rate setting. For example, the value of Q_drain_duration may be set to 1/video_codec_rate_change_freq. Here, video_codec_rate_change_freq is the frequency at which the video codec can change its rate.

In an aspect of the disclosure, the minimum and maximum values for Q_drain_duration may be set to Q_drain_duration_min and Q_drain_duration_max, respectively, and the value of Q_drain_duration may be determined by Equation (5).

$$\text{Q\_drain\_duration} = \quad \text{Equation (5)}$$
$$\max\left(\min\left(\frac{1}{\text{video\_codec\_rate\_change\_freq}}, \text{Q\_drain\_duration\_max}\right), \text{Q\_drain\_duration\_min}\right)$$

Here, Q_drain_duration_min and Q_drain_duration_max are constants that determine the smallest and largest allowed setting for the vale of Q_drain_duration. The value of Q_offset may be set to a suitable value such that it reflects the amount of delay or latency in the modem queue that the VT application may tolerate. In an aspect of the disclosure, the Q_offset can be set as follows:

Q_offset=Modem_uplink_channel_capacity*delay_threshold, where delay_threshold is the amount of delay or latency that is tolerated in the modem queue. This parameter delay_threshold may be dynamically varied. In some aspects of the disclosure, the delay_threshold and the application latency may be the same.

Figure 15:
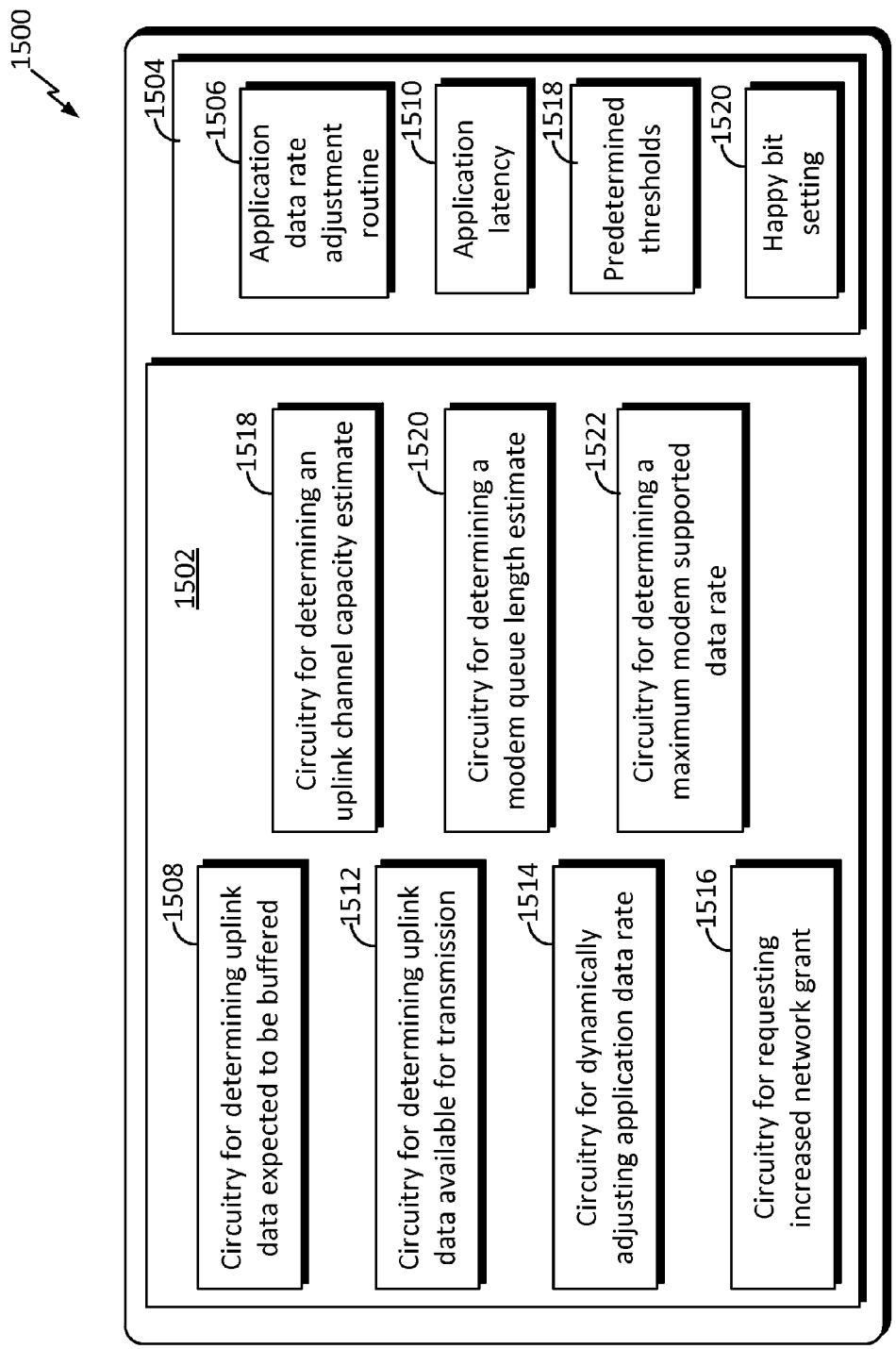
FIG. 15 is a conceptual diagram illustrating a processing system configured to perform the processes of FIGS. 5-14 in accordance with aspects of the disclosure.

FIG. 15 is a conceptual diagram illustrating a processing system 1500 in accordance with aspects of the disclosure. The processing system 1500 may be the processing system 100 of a UE. The UE may be the UE 502. For clarity, a processor 1502 and a computer-readable medium 1504 are shown in FIG. 15. It should be understood the processing system 1500 may include other components such as those shown in FIG. 1 and those commonly known in the art. The processor 1502 includes a number of circuitries that may be configured to perform various functions and processes described in FIGS. 5-14 when the software in the computer-readable medium 1504 is executed. The circuitries may be hardware, software, or a combination of hardware and software.

In one aspect of the disclosure, the processor 1502 may execute an application data rate adjustment routine 1506 to configure the various circuitries of the processor 1502 to perform the functions and processes illustrated in FIGS. 5-14. For example, a first circuitry 1508 may be configured to determine a first amount of uplink data expected to be buffered at an RLC layer of the UE 502 based on an application latency 1510 of an application. The application may be the application 504 (FIG. 5). A second circuitry 1512 may be configured to determine a second amount of uplink data available for transmission at the RLC layer based on information provided by a modem of the UE. A third circuitry 1514 may be configured to dynamically adjust a data rate of the application based on a difference between the first amount of the uplink data and the second amount of the uplink data. A fourth circuitry 1516 may be configured to request increased network grant from a network by performing the methods and processes illustrated in FIGS. 12 and 13. For example, the fourth circuitry 1516 may maintain an amount of the uplink data buffered at the RLC layer to be greater than a predetermined threshold 1518 that sets a Happy bit at an unhappy setting 1520 and communicate the unhappy setting to the network.

In one aspect of the disclosure, the processing system 1500 may be configured to determine a maximum modem supported data rate at the UE 502 as illustrated in FIG. 14. A fifth circuitry 1518 may be configured to determine an uplink channel capacity estimate of an uplink channel. A sixth circuitry 1520 may be configured to determine a modem queue length estimate of a modem queue 517. A seventh circuitry 1522 may be configured to determine a maximum modem supported data rate at which the UE transmits data of an application based on the uplink channel capacity estimate, the modem queue length estimate, a codec rate change frequency of the application, and a delay threshold 1518 of the modem queue.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a user equipment, comprising:
   transmitting uplink data of an application operating at a user equipment (UE) to a network;
   determining a first amount of the uplink data expected to be buffered at a radio link control (RLC) layer based on a latency of the application;
   determining a second amount of the uplink data available for transmission at the RLC layer based on information provided by a modem of the UE;
   dynamically adjusting a data rate of the application based on a difference between the first amount of the uplink data and the second amount of the uplink data; and
   wherein the first amount of the uplink data is a configurable parameter having a selected value such that uplink data is buffered for a time period not greater than the latency of the application.

2. The method of claim 1, wherein determining the second amount of the uplink data comprises:
   determining an average amount of the uplink data available for transmission at the RLC layer; and
   determining an average amount of uplink data rate, wherein the second amount of the uplink data corresponds a ratio of X to Y, where X is the average amount of the uplink data available for transmission at the RLC layer, and Y is the average amount of uplink data rate.

3. The method of claim 1, wherein dynamically adjusting the data rate of the application comprises:
   if the second amount of the uplink data is greater than the first amount of the uplink data, decreasing a data rate of the application; and
   if the second amount of the uplink data is less than the first amount of the uplink data, increasing the data rate of the application.

4. The method of claim 1, further comprising:
   maintaining an amount of the uplink data buffered at the RLC layer to be greater than a threshold that sets a Happy bit at an unhappy setting; and
   communicating the unhappy setting to the network.

5. The method of claim 1, wherein dynamically adjusting the data rate of the application comprises gradually adjusting the data rate based on a function of the difference between the first amount of the uplink data and the second amount of the uplink data.

6. The method of claim 5, wherein the function comprises an exponential function.

7. The method of claim 1, wherein the application comprises a video telephony application.

8. A user equipment, comprising:
   at least one processor;
   a communication interface coupled to the at least one processor; and
   a memory comprising executable software coupled to the at least one processor, wherein the at least one processor and the memory are configured to:
   transmit uplink data of an application operating at the user equipment to a network;
   determine a first amount of the uplink data expected to be buffered at a radio link control (RLC) layer based on a latency of the application;

determine a second amount of the uplink data available for transmission at the RLC layer based on information provided by a modem of the user equipment;

dynamically adjust a data rate of the application based on a difference between the first amount of the uplink data and the second amount of the uplink data; and wherein the first amount of the uplink data is a configurable parameter having a selected value such that uplink data is buffered for a time period not greater than the latency of the application.

9. The user equipment of claim 8, wherein the at least one processor and the memory are configured to:

determine an average amount of the uplink data available for transmission at the RLC layer; and determine an average amount of uplink data rate, wherein the second amount of the uplink data corresponds a ratio of X to Y, where X is the average amount of the uplink data available for transmission at the RLC layer, and Y is the average amount of uplink data rate.

10. The user equipment of claim 8, wherein the at least one processor and the memory are configured to:

if the second amount of the uplink data is greater than the first amount of the uplink data, decrease a data rate of the application; and if the second amount of the uplink data is less than the first amount of the uplink data, increase the data rate of the application.

11. The user equipment of claim 8, wherein the at least one processor and the memory are configured to:

maintain an amount of the uplink data buffered at the RLC layer to be greater than a threshold that sets a Happy bit at an unhappy setting; and communicate the unhappy setting to the network.

12. The user equipment of claim 8, wherein the at least one processor and the memory are further configured to:

gradually adjust the data rate based on a function of the difference between the first amount of the uplink data and the second amount of the uplink data.

13. The user equipment of claim 12, wherein the function comprises an exponential function.

14. The user equipment of claim 8, wherein the application comprises a video telephony application.

\* \* \* \* \*